(12) United States Patent
Hill et al.

(10) Patent No.: US 10,007,068 B2
(45) Date of Patent: Jun. 26, 2018

(54) OPTICAL FIBER CONNECTOR

(71) Applicant: Clearfield, Inc., Minneapolis, MN (US)

(72) Inventors: John P. Hill, Andover, MN (US);
Walter E. Power, II, Jordan, MN (US);
Yuki Nishiguchi, Marlborough, MA (US)

(73) Assignee: Clearfield, Inc., Minneapolis, MN (US)

( * ) Notice: Subject to any disclaimer, the term of this patent is extended or adjusted under 35 U.S.C. 154(b) by 0 days. days.

(21) Appl. No.: 15/618,973

(22) Filed: Jun. 9, 2017

(65) Prior Publication Data

US 2017/0285275 A1    Oct. 5, 2017

Related U.S. Application Data

(63) Continuation of application No. 15/049,274, filed on Feb. 22, 2016, now Pat. No. 9,678,285, which is a continuation of application No. 14/078,449, filed on Nov. 12, 2013, now Pat. No. 9,297,976.

(60) Provisional application No. 61/726,342, filed on Nov. 14, 2012.

(51) Int. Cl.
*G02B 6/36* (2006.01)
*G02B 6/38* (2006.01)
*G02B 6/44* (2006.01)
*G02B 6/46* (2006.01)

(52) U.S. Cl.
CPC ......... *G02B 6/3874* (2013.01); *G02B 6/3821* (2013.01); *G02B 6/3849* (2013.01); *G02B 6/3878* (2013.01); *G02B 6/3893* (2013.01); *G02B 6/4465* (2013.01); *G02B 6/46* (2013.01)

(58) Field of Classification Search
CPC .. G02B 6/3887; G02B 6/3869; G02B 6/3821; G02B 6/3885; G02B 6/3855; G02B 6/36
See application file for complete search history.

(56) References Cited

U.S. PATENT DOCUMENTS 9,678,285 B2 *   6/2017   Hill ..................... G02B 6/3874

\* cited by examiner

*Primary Examiner* — Jennifer Doan
(74) *Attorney, Agent, or Firm* — Pepper Hamilton LLP

(57) ABSTRACT

An optical fiber connector and method for assembly and use are disclosed. The optical fiber connector is configured to have a small footprint so that the connector may be pushable or pullable through a conduit if use of a conduit may be needed. The connector may include a first number of connector components configured to fit through a conduit, and a second number of connector components that are configured to be installed to the first components, for example, after the connector is pushed or pulled through a conduit.

26 Claims, 11 Drawing Sheets

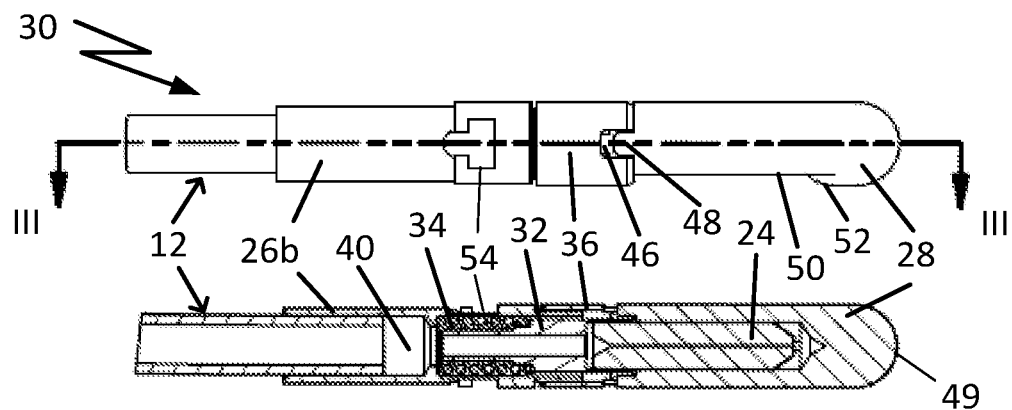
FIG. 3  SECTION III-III
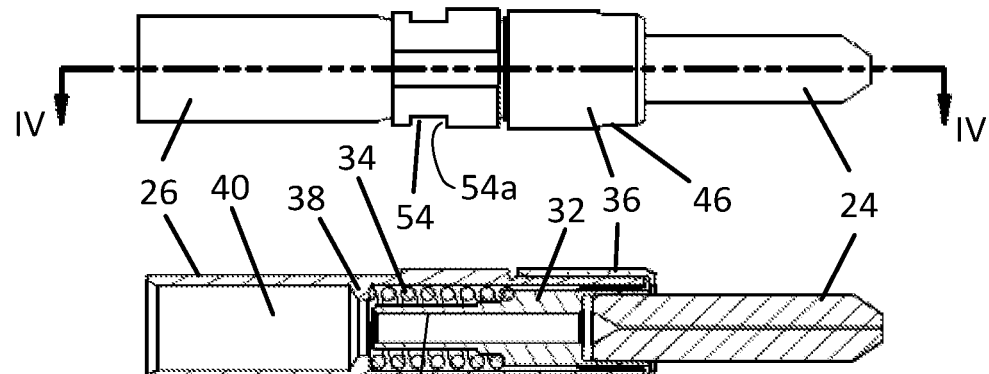
FIG. 4  SECTION IV-IV
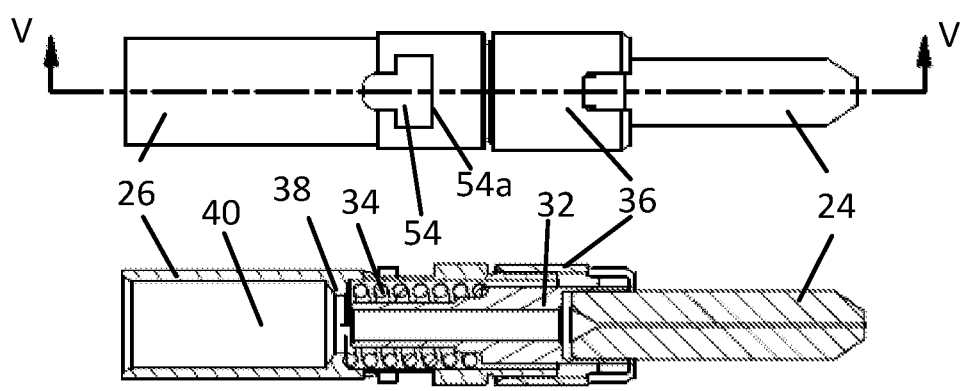
FIG. 5  SECTION V-V

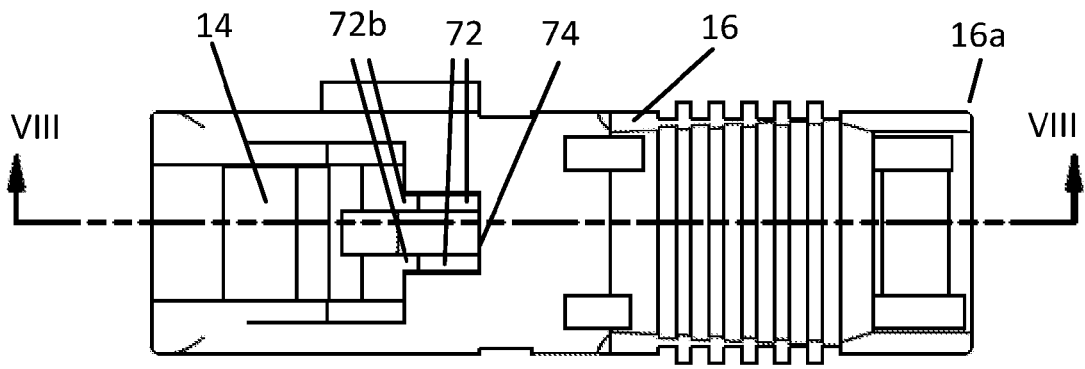
FIG. 8A
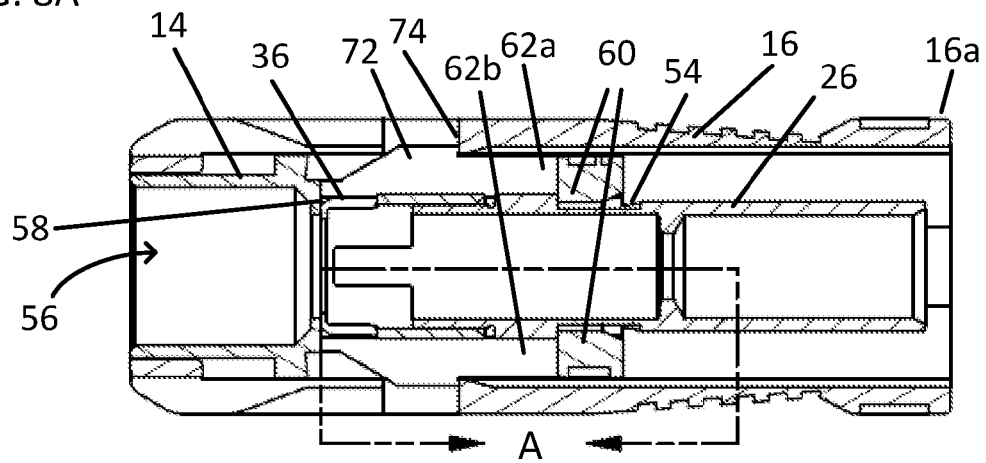
FIG. 8B  SECTION VIII-VIII
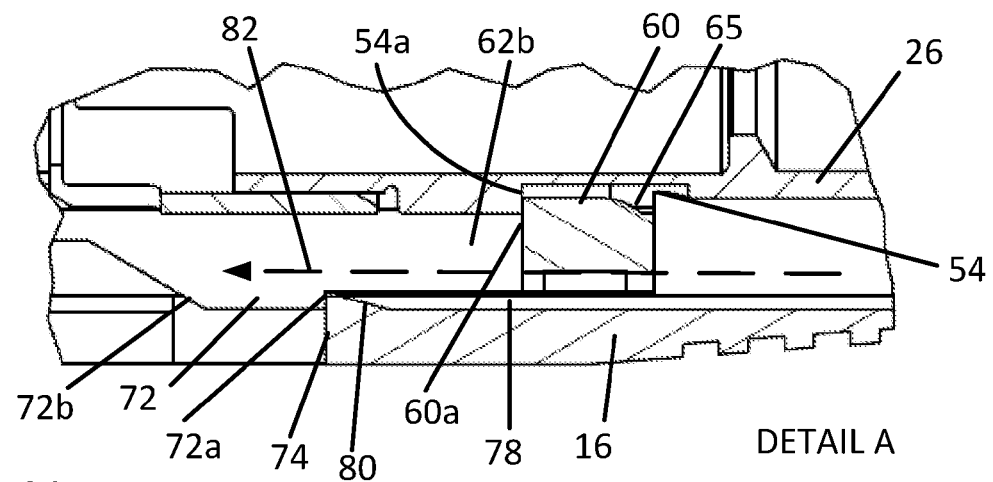
FIG. 8C  DETAIL A

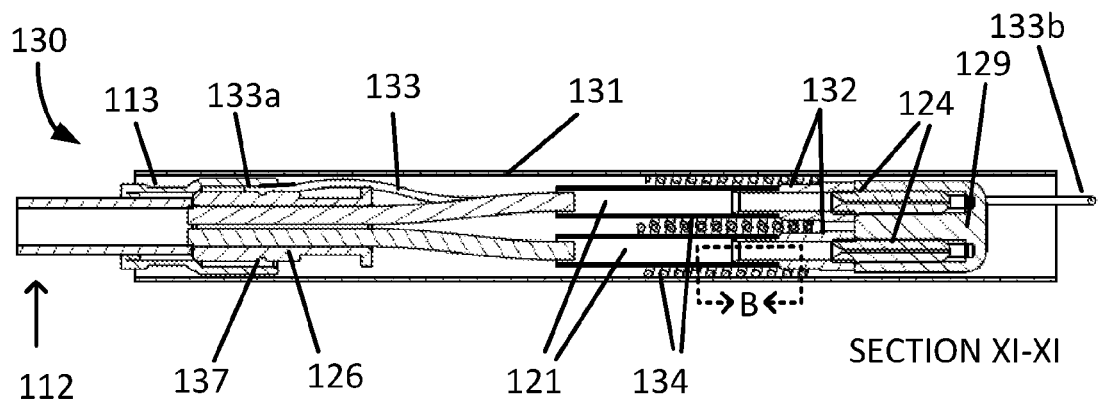
FIG. 11
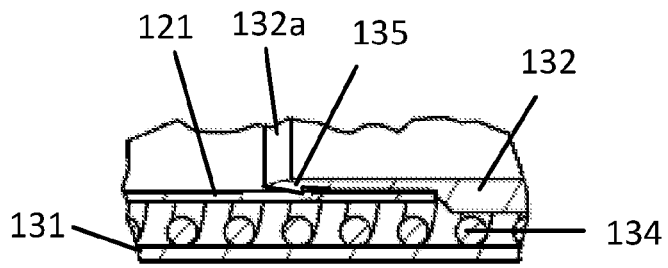
FIG. 12    DETAIL B
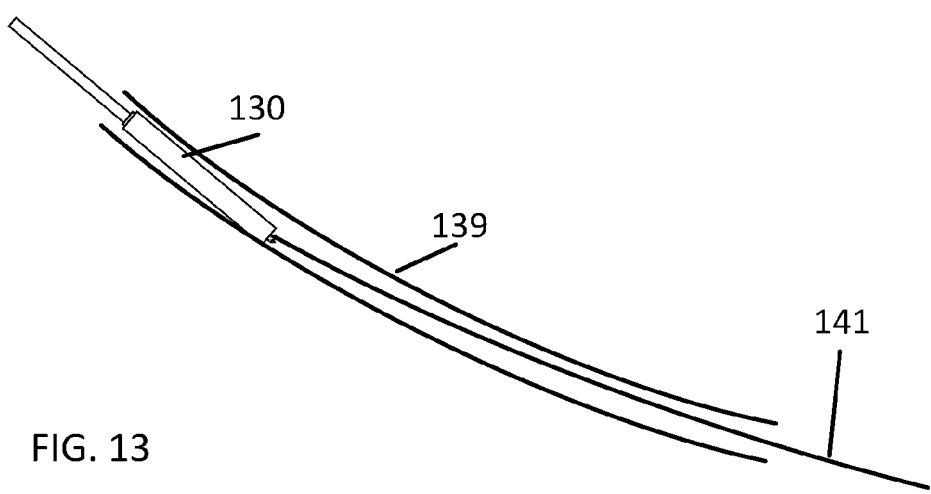
FIG. 13

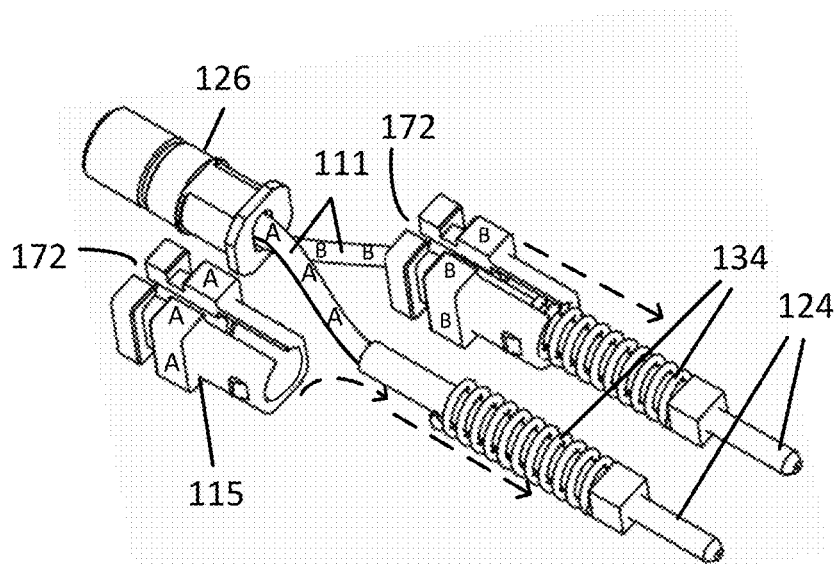
FIG. 14
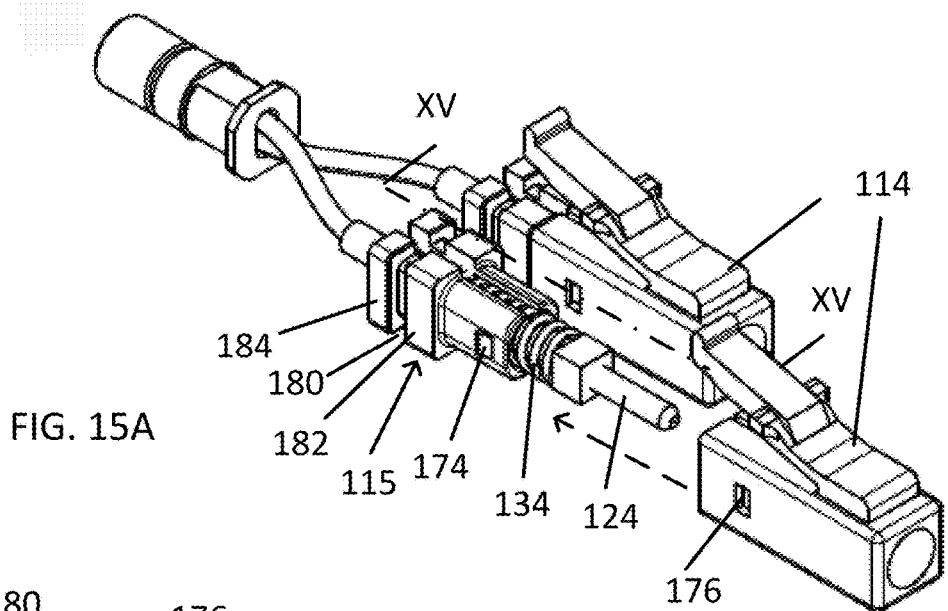
FIG. 15A
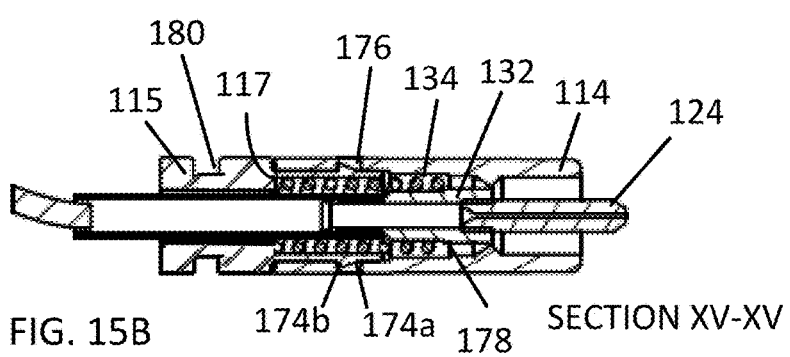
FIG. 15B  SECTION XV-XV

OPTICAL FIBER CONNECTOR

CROSS-REFERENCE TO RELATED APPLICATION

This application is a continuation of U.S. patent application Ser. No. 15/049,274, filed Feb. 22, 2016, which is a continuation of Ser. No. 14/078,449 filed Nov. 12, 2013, which claims the benefit of U.S. Provisional Application No. 61/726,342, filed Nov. 14, 2012, all of which are incorporated herein by reference in their entirety.

BACKGROUND

The use of fiber optics for communications purposes continues to grow. Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber. Each connection or coupling requires a connector and adaptor to align the fibers such that the light can transmit without interruption.

The connector in joining fiber ends, for example, has, as its primary function, the maintenance of the fiber ends in an abutting relationship such that the core of one of the fibers is axially aligned with the core of the other fiber to maximize light transmissions from one fiber to the other. Another goal is to minimize back reflections. An alignment can be extremely difficult to achieve, as a good alignment (low insertion loss) of the fiber ends is a function of the alignment, the width of the gap (if any) between the fiber ends, and the surface condition of the fiber ends, all of which, in turn, are inherent in the particular connector design. The connector must also provide stability and junction protection and thus it must minimize thermal and mechanical movement effects. These same considerations apply to arrangements where the fiber, terminated in a plug connector, is to be used with active or passive devices, such as, for example, computers or transceivers and the like.

There are numerous, different, connector designs in use for achieving low insertion loss and stability. Some example connectors may include, but are not limited to, SC, Dual LC, LC, ST and MPO connectors. In most of these designs, a pair of ferrules (one in each connector, or one in the connector and one in the apparatus or device), each containing an optical fiber end, are butted together end to end and light travels across the junction. Zero insertion loss requires that the fibers in the ferrules be exactly aligned, a condition that, given the necessity of manufacturing tolerances and cost considerations, is virtually impossible to achieve, except by fortuitous accident. As a consequence, most connectors are designed to achieve a useful, preferably predictable, degree of alignment.

Therefore, since the mechanical tolerances involved in terminating optical fiber are stringent in most applications, optical fiber is generally not terminated on site. In situations wherein optical fiber must be terminated on site, it may take a skilled technician between about 15 to 20 minutes to splice the fibers together using specialized splicing equipment. Optical fiber is therefore often provided in a range of different lengths, pre-terminated at both ends with a connector plug ready to plug into a matching receptacle.

In many installations, optical fiber cables are routed through a protective conduit, that not only protects the cable, but also allows for rapid restoration methods when the conduit, fiber optic cable, or both are cut or damaged and replacement is necessary. Since pre-installed connectors are of an industry standard footprint, the fully assembled connectors may be too large to be pushed or pulled through microduct because of size constraints, as some microducts may have internal diameters of only about 6 mm, essentially large enough for the cables to fit through, but not a fully assembled connector.

It has therefore become desirable to provide partially assembled connectors, pre-assembled with requisite tolerances, that may be able to be pushed or pulled through a conduit. Any additional final assembly of the connector components may then be performed on site once the objective of delivering the fiber through a length of microduct has been achieved. There remains a need for pre-assembled cables and cable connectors that have a smaller footprint, allowing for the pre-assembled cables to be inserted through minimal diameter conduit to thereby minimize the intrusion of placing the pathway or conduit for the fiber optic network, while also minimizing on-site assembly time and costs.

SUMMARY

Fiber optic cable assemblies may be configured so that the terminal ends of the cables have pre-installed back-post assemblies that include pre-installed ferules that meet the requisite tolerances needed for fiber optic transmissions. The remaining connector housing may be provided separately and may be configured to be attached to the back-post assembly after installation of the cable. To protect the ferule from damage during installation though a conduit, the ferrule assembly may be enclosed within a protective enclosure.

In an embodiment, a terminal end assembly for an optic fiber cable includes a ferrule assembly that includes a ferrule for receiving and terminating an optic fiber of an optic fiber cable, and a ferule holder having a first end for receiving the optic fiber therethrough, and a second end opposite the first end for receiving and retaining the ferrule therein. The end assembly also includes a tubular connector body having a first end configured for receiving and retaining a terminal end of a fiber optic cable therein, and a second end configured for slidably receiving the ferrule holder therein, the ferrule holder being axially movable within the second end for movement of the ferrule towards and away from the connector body. The assembly also includes a biasing member for being disposed within the connector body for biasing the ferrule holder axially away from the connector body, and a ferrule retainer for retaining the ferrule holder within the second end of the connector body. The retainer includes a tubular body for being disposed around the ferrule and ferrule holder, and the tubular body having a first end configured for engaging with the connector body for retaining the ferrule holder with the connector body, and a second end configured for limiting movement of the ferrule holder axially away from the connector body in opposition to the biasing, wherein the ferrule retainer and the tubular connector body together form an encasement for encasing the biasing member and ferrule retainer.

In an embodiment, a pre-terminated optical fiber cable includes at least one optical fiber terminated at least one end thereof with an encased ferrule assembly of a size configured for being axially movable through a microconduit.

In an embodiment, an optical fiber connector includes a pre-terminated optical fiber cable configured for being pushed or pulled through a conduit. The pre-terminated optical fiber cable includes a fiber optic cable having an optic fiber, and a tubular connector body having a first end disposed about an end of the optic cable and retaining the fiber optic cable therein, and a second end opposite the first end. The pre-terminated cable also includes a ferrule assembly terminating the optical fiber cable, the ferrule assembly including a ferrule terminating the optic fiber, and a ferrule holder having a first end axially slidably disposed within the second end of the connector body, and a second end opposite the first end and retaining the ferrule therein. The pre-terminated cable also includes a spring member disposed about the first end of the ferrule holder within second end of the connector body and biasing the ferrule holder axially away from the connector body, and a ferrule retainer retaining the ferrule holder within the second end of the connector body. The retainer includes a tubular body disposed around the ferrule and ferrule holder, and the tubular body has a first end in engagement with the connector body for retaining the ferrule holder with the connector body, and a second end disposed around the ferrule for limiting movement of the ferrule holder axially away from the connector body in opposition to the biasing. The pre-terminated cable also includes an end cap disposed around the ferrule and in engagement with the ferrule retainer. The optical fiber connector also includes an inner ferrule housing and an outer housing. The inner ferrule housing has a central longitudinal cavity configured for receiving the connector body therein, wherein the ferrule housing is axially slidably displaceable over the connector body, and at least one of the ferrule housing and the connector body includes a first retaining member for releasably engaging and retaining the ferrule housing with the connector body. The outer housing is configured for mating with an optical fiber socket by push/pull engagement and disengagement, and the outer housing includes a central longitudinal cavity configured for receiving the inner ferrule housing therein, wherein the outer housing is axially slidably displaceable over the ferrule housing, and at least one of the ferrule housing and the outer housing includes a second retaining member for releasably engaging and retaining the outer housing with the ferrule housing.

In an embodiment, a method for installation of an optical fiber includes obtaining a pre-terminated optical fiber cable comprising at least one optical fiber terminated at at least one end thereof with an encased ferrule assembly of a size configured for being axially movable through a microconduit, feeding the pre-terminated optical fiber cable through a microconduit; axially sliding an inner ferrule housing over the pre-terminated end and engaging the ferrule housing with the encased ferrule assembly; axially sliding an outer connector housing over the ferrule housing and engaging the outer connector housing with the ferrule housing; and mating the outer connector housing with an optical fiber socket.

BRIEF DESCRIPTION OF THE FIGURES

FIG. 3 depicts a plan view with a corresponding cross-sectional view of a pre-terminated fiber optic cable according to an embodiment.

FIGS. 4 and 5 depict different plan views and corresponding cross-sectional views of elements of a pre-terminated fiber optic cable according to an embodiment.

FIGS. 8A-8C depict a plan view, corresponding cross-sectional view, and detail view of assembled components of a pre-terminated fiber optic cable according to an embodiment.

FIG. 11 depicts a cross-sectional view of the connector of FIG. 10A according to an embodiment.

FIG. 12 depicts a detail of the connector of FIG. 12 according to an embodiment.

FIG. 13 depicts a pre-terminated cable being pulled through a conduit according to an embodiment.

FIG. 14 depicts a perspective view of a portion of a connector assembly according to an embodiment.

FIGS. 15A-15B depict perspective and cross-sectional views of a portion of a connector assembly according to an embodiment.

DETAILED DESCRIPTION

Figure 1A:
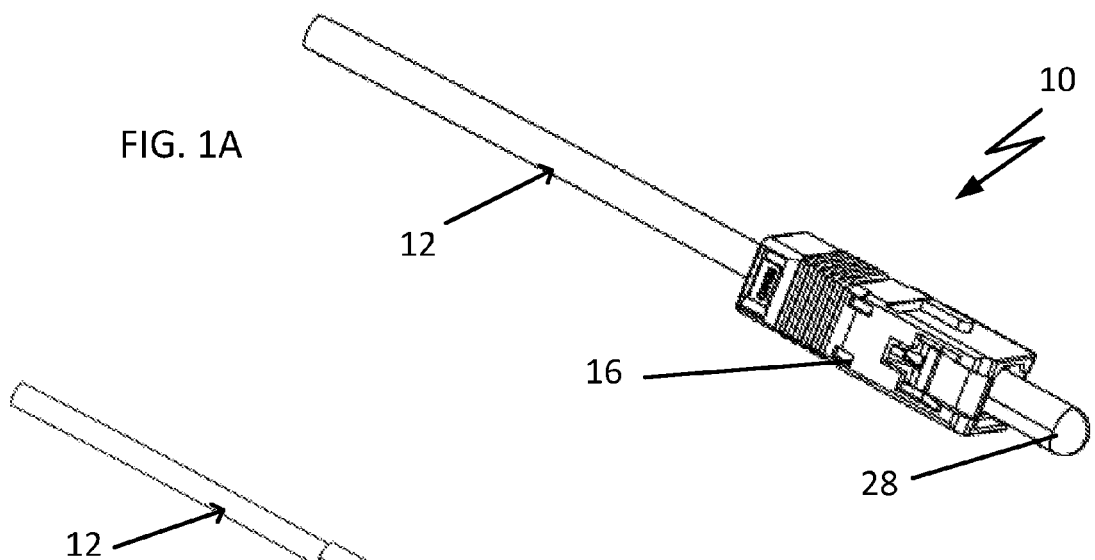
FIGS. 1A-1C depict views of a fiber optic cable and connector assembly according to an embodiment.
Figure 1B:
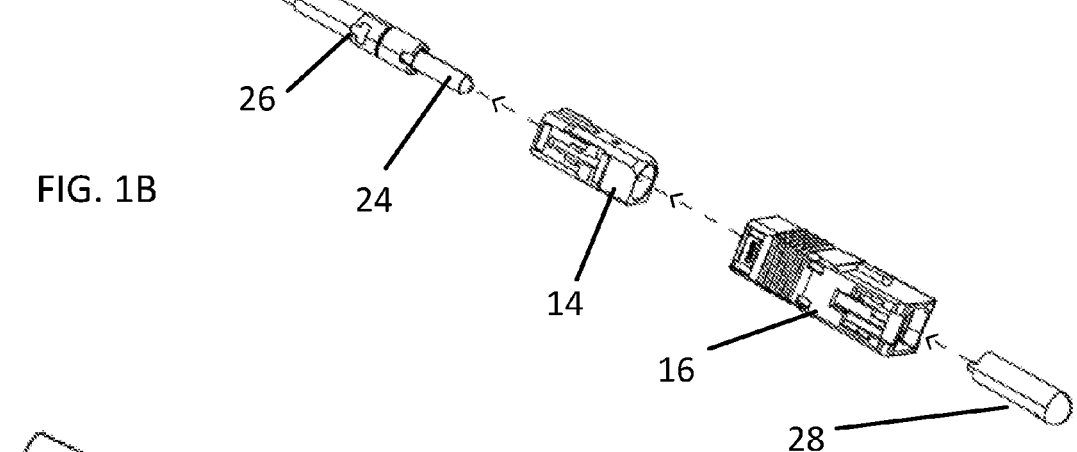
Figure 9A:
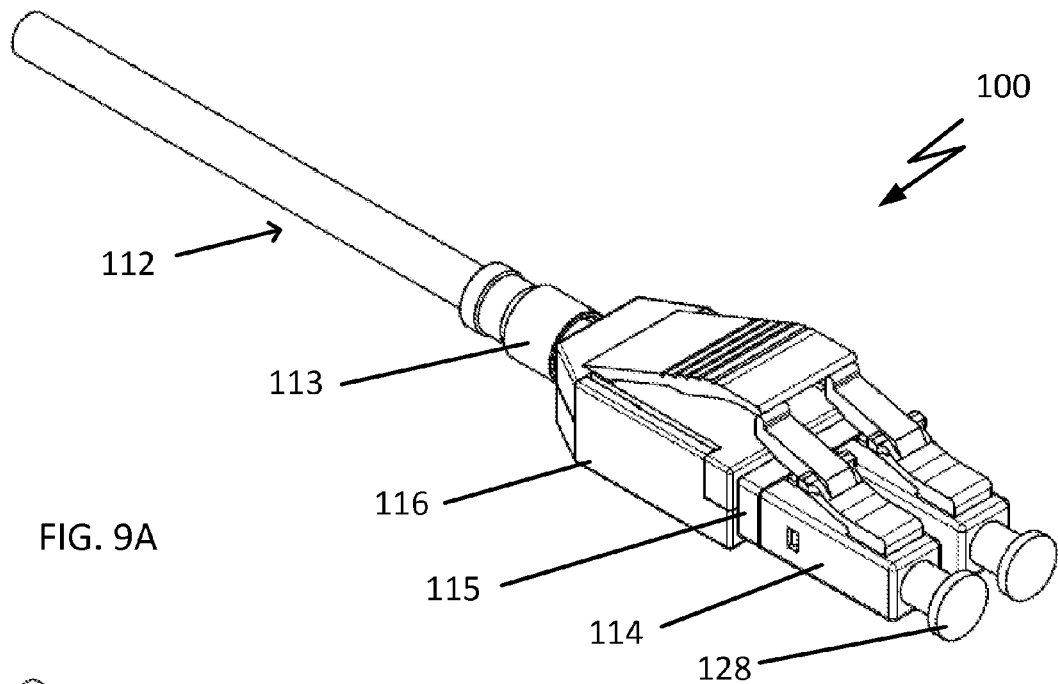
FIG. 9A-9B depict a duplex optical fiber connector assembly according to an embodiment.
Figure 9B:
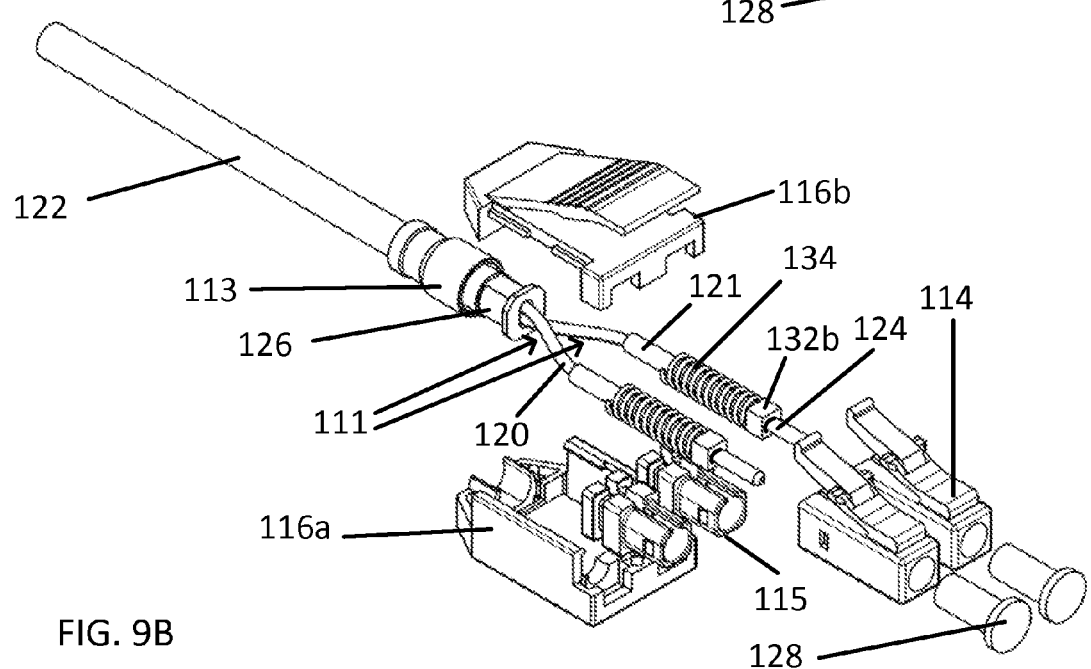

FIGS. 1A and 1B depict perspective views of a fiber optic connector 10 in an assembled view (FIG. 1A) and a disassembled component view (FIG. 1B). While the depicted fiber optic connector 10 is of an SC type connector, any description and drawings presented herein are also applicable to other types of fiber optic connectors, such as, for example, MPO, MT-RJ, APC (Angled Polished Connector), SC APC, FC, FC APC, ST, LC, LC APC, dual or simplex, with multi-mode or single-mode fibers. An LC duplex fiber optic connector is depicted in FIGS. 9A and 9B.

Figure 1C:
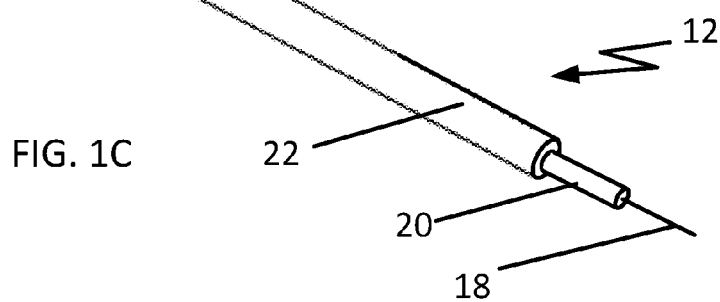

In an embodiment as depicted in FIGS. 1A and 1B, a connector 10 may include an optical fiber cable 12, a ferrule-housing 14, and an outer housing 16 to provide a push/pull engagement and disengagement with a mating optical fiber socket (not shown). As represented in FIG. 1C, a cable 12 may have an optical fiber 18, with a protective layer 20, and an outer sheath 22. In an embodiment of a single strand SC connector, an optical fiber 18 may have a diameter of about 125 μm, the protective layer 20 may have a diameter of about 900 μm, and the outer sheath 22 may have a diameter of about 3 mm to about 5 mm.

The optical fiber 18 may terminate in a ferrule 24 retained with the cable 12 by means of a connector body 26, discussed in more detail below. The connector body 26 provides a back post for the connector assembly. In an embodiment, the ferrule 24 may be a cylindrical ceramic ferrule. A protective cap 28 may be provided to protect the ferrule 24 and terminal end of the optical fiber 18 prior to a final installation or connection with a mating wire or device (not shown).

As discussed previously, because of the required mechanical tolerances in the terminal end of a cable 12, costs may be reduced with an increase in quality by providing pre-terminated lengths of cable, pre-terminated at both ends with a connector plug ready to plug into a matching receptacle. In an embodiment, wherein there were no size restrictions (for example, in the cross-sectional dimensions of the housing 16), a pre-terminated cable may be represented by the configuration as depicted in FIG. 1A, with the connector housing 16 attached to the cable 12 and the cable ends ready for connection to a coupling arrangement.

However, as mentioned previously, it is often desirable to feed the cable 12 through small diameter conduit, for example less than about 10 mm ID, to guide the cable to a destination, and provide protection for an installed cable. The conduit may be bend limiting to limit the radius of curvature through which the conduit may be bent. Therefore, it is desirable to provide pre-terminated cables that have minimal cross-sectional dimension, or diameter, that allows the cable to be inserted through a bent conduit. A pre-terminated cable may therefore be represented by the configuration as depicted in the left-hand portion of FIG. 1B, wherein the cable 12 is fitted with at least the ferrule 24 that provides the terminal end of the optical fiber 18. In addition, to protect the ferrule 24 and terminal end of the optical fiber 18, it may also be desirable to provide the pre-terminated cable ends with an installed protective cap 28.

Figure 2A:
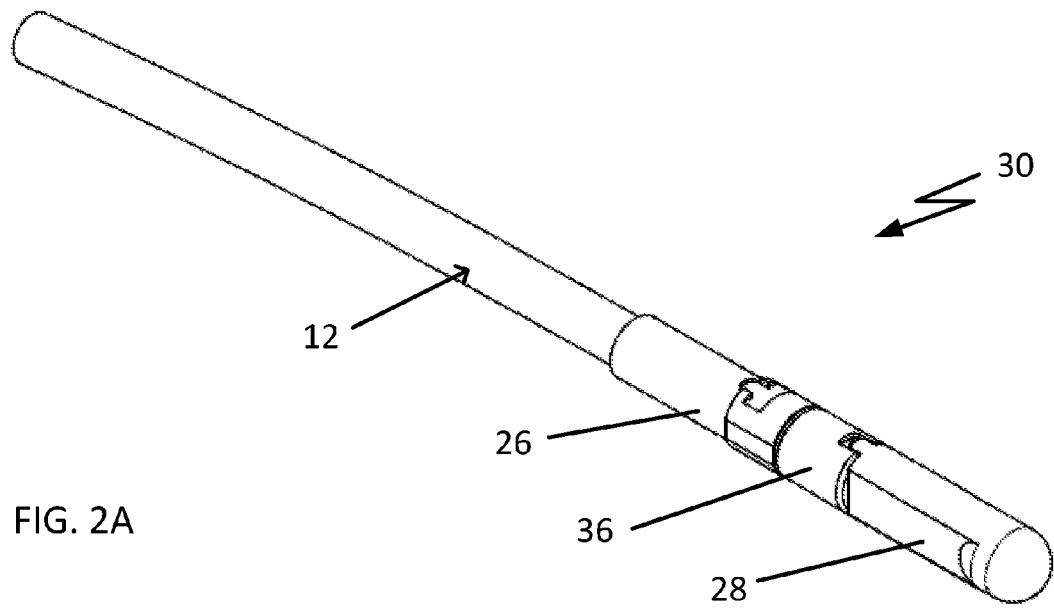
FIGS. 2A-2B depict a pre-terminated fiber optic cable and an exploded view of the parts thereof, according to an embodiment.
Figure 2B:
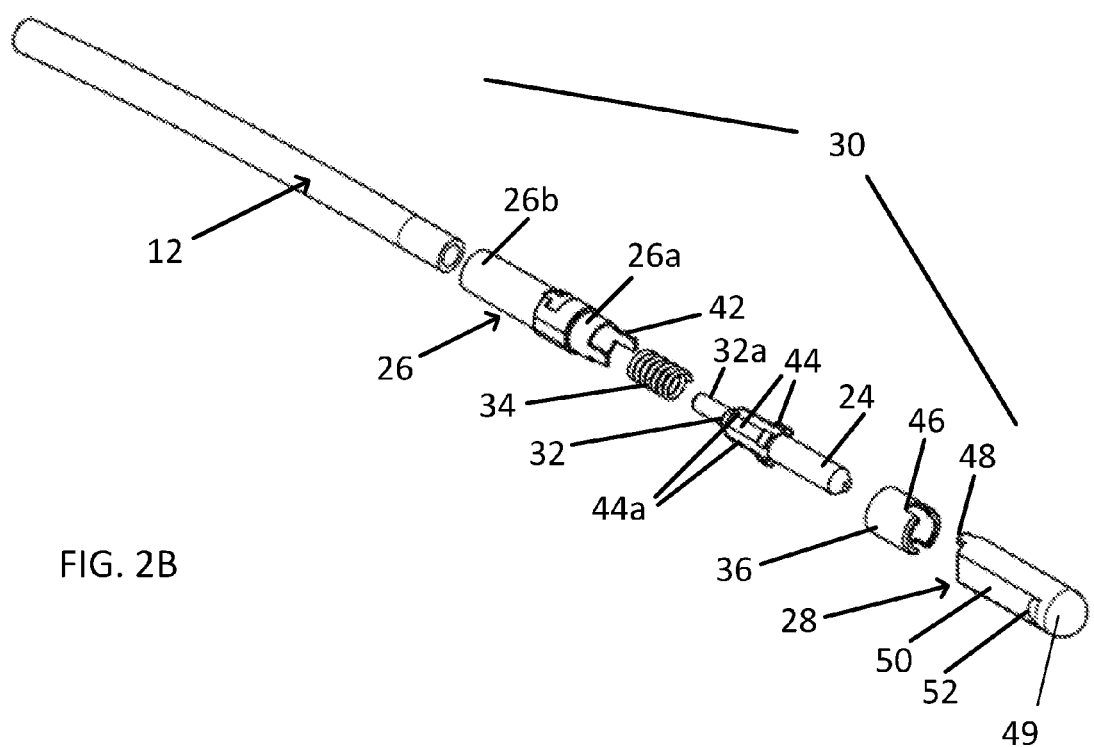

An embodiment of a pre-terminated cable 30 with a protective cap 28 installed is represented in FIG. 2A, while FIG. 2B provides a view of the parts. The ferrule 24 may be fitted into a ferrule holder 32. In FIG. 2B the cable 12 is truncated for clarity, but the end of the cable would be similar to the depiction of FIG. 1C, with the fiber optic cable 18 extending through the body of the ferrule 24 to the terminal end of the ferrule, and the protective layer 20 terminating at approximately the other end of the ferrule within the ferrule holder 32. A biasing member, such as a spring 34 may be included to provide a biasing force for pressing the ferrule into engagement with an end of another fiber optic device, such as another ferrule. In an embodiment, post 32a of the holder 32 may be crimped about the layer 20 to better retain the fiber in the ferrule 24.

A ferrule retainer 36 may be included to retain the ferrule holder 32 and biasing member 34 within the connector body 26. The retainer 36 may fit over the end 26A of the connector body 26 and may itself be retained on the end 26A by a friction fit. Because of the biasing force of the biasing member 34 pressing the ferrule holder outwardly from the connector body 26 the friction fit will need to be sufficiently tight to hold the retainer 36 on the end 26A. This may be achieved by making the internal diameter of the retainer 36 slightly less than the external diameter of the end 26A. Alternatively, a variety of other types of retention configurations, or combinations of retention configurations may be provided. For example, a permanent connection may be provided with adhesive between the end 26A and the retainer 36, or, while not shown, one of the end 26A or retainer 36 may include a circumferential groove, and the other of the end or retainer may include a circumferential projection which fits into the groove to provide an additional interlocking force to hold the retainer in place.

FIGS. 3-5 provide plan views and cross-sectional views of the pre-terminated cable end 30. FIG. 3 includes cable 12 and protective cap 28, and FIGS. 4 and 5 provide two different longitudinal views at 90° from one another. As shown in FIGS. 4 and 5, within the connector body 26 there may be a plurality of projections 38 that project into the internal cavity 40, (for example a minimum of three spaced at about 120° or four space at about 90°) or alternatively an inwardly projecting ring that extends the full 360° around the inside of the internal cavity 40. The projection 38 may serve two purposes, providing a stop for the insertion of the cable, wherein the cable outer sheath 22 may abut the projection on the one side, and the other side of the projection may provide a shoulder for the biasing member 34. In the depicted embodiment, a spring, as biasing member 34, may therefore be disposed within the cavity 40, with one end of the spring abutting the projection 38, and the other end of the spring abutting the ferrule holder 32, so that upon assembly, the spring becomes compressed between the shoulder projection 38 and the ferrule holder to apply a bias to the ferrule holder when assembled. As described above, the ferrule retainer 36, may then hold the spring (biasing member 34) and ferule holder 32 in the connector body 26.

Upon insertion of a fiber optic cable 12 into the internal cavity 40, end 26b of the connector body 26 may be crimped onto the cable 12. Instead of crimping, other types of engagement configurations may be used. For a more permanent connection, an adhesive may be used to retain the cable 12 within the connector body 26. Alternatively, a plurality of teeth may be provided on the internal surface within the cavity 40, wherein the teeth may have a longitudinally extending surface that reduces the internal diameter of the cavity in the insertion direction, thereby allowing the cable to be forcibly inserted into the cavity, whereby a trailing edge of the teeth will then engage into the outer surface of the cable sheath 22 and hold the cable in place within the cavity 40.

In an embodiment, it may be desirable for the pre-terminated cable end 30 to include alignment and anti-rotation features. As shown in FIG. 2B, end 26A of the connector body 26 may include at least one arm extension 42 that fits between a pair of guide arms 44 of the ferrule holder 32. The guide arms 44 may define a channel 44a therebetween into which the arm extension 42 may sliding be disposed. Interaction of the arm extensions 42 and guide arms 44 may allow for longitudinal sliding movement of the ferrule holder 32 within the internal cavity 40 while preventing any rotational movement. This type of guided movement may be used, for example, for ferrules that may have an angled tip (not shown), so that the tip surfaces of two tip-to-tip aligned ferrules may remain properly aligned and in full surface to surface contact.

While at least one arm extension 42 and pair of guide arms 44 may be sufficient to inhibit rotation, additional ones of the arms may be provided as shown in FIG. 2B, wherein two oppositely disposed arm extensions 42 extend from the end 26A (at about 180° from one another), and the ferrule holder 32 includes four guide arms 44 disposed at about 90°, with guide channels 44a disposed between each pair of adjacent guide arms. In the depicted embodiment, the ferrule holder 32 may be disposed at any of four rotational positions with respect to the end 26A. Other type of anti-rotational configurations, or combinations of anti-rotational configurations may also be provided. For example, the interior surface of the end 26A may include alignment grooves, and the external surface of the ferrule holder 32 may include projections corresponding to the grooves.

As shown in FIGS. 2B and 3, the ferrule retainer 36 may include alignment notches 46 that are configured to receive corresponding projections 48 of the protective cap 28 to prevent the protective cap from spinning on the ferrule 24. In an embodiment, the protective cap 28 may also be configured without such projections 48, thereby allowing for the cap to spin about the ferrule 24. The alignment notches 46 may also align with channels 44a, and in an embodiment, the notches 46 may be aligned with channels 44a that do not have the arm extensions 42 disposed therein. The projections 48 may have a thickness dimension that allows the projections to not only align with the notches 46, but also thereby align with and extend into the channels 44a. The protective cap 28 may fit sufficiently snugly around the ferrule 24 so that the cap may be retained on the ferrule by friction. Any of a variety of other types of alignment and retention configurations, or combinations thereof, such as those already discussed previously may also be used. As an additional example, the circumferential edges of the projections 48 (in FIG. 3—the edges facing up and down) may fit tightly within the circumferential edges of the notches 46 to frictionally retain the cap 28 with the retainer 36, or the same edges may have projections/corresponding recesses that may snap together to hold the cap in place.

As shown in the figures, the leading tip 49 of the dust cap 28 may be shaped to facilitate movement of a cable 12 with pre-terminated end 30 through a conduit. As an example, tip 49 may have a rounded, ballistic configuration. In an embodiment, the cap may be formed of a low friction material, such as PTFE, to facilitate movement of the cap along the inside of a conduit. The rounded tip 49 may allow for easier passage through a tight radius during installation, such as when the cable 12 is being pushed or pulled through a duct/conduit that is bent and includes a tight radius. A component such as a drill may be used, in a number of embodiments, to push an optical fiber connector through a duct. For example, a household cordless drill may be fitted with a feed device that is configured to feed the cable forward upon rotary motion of the drill. Installation may then be done with relatively inexpensive tools.

As shown in FIGS. 2B and 3, the protective cap 28 may include a gripping feature for ease of gripping and removing the cap from the ferrule 24. In an embodiment as shown the cap 28 may include a flat surface 50 with a raised edge 52 that provides an engagement surface for gripping and pulling the cap off of the ferrule 24. For example, a user's thumb may be placed on the flat surface 50 to engage the edge 52 to pull the cap 28 from the ferrule 24.

In an embodiment, the end cap 28, the ferrule retainer 36 and at least a portion of the connector body 26 may be configured to completely surround and enclose the ferrule 24, ferrule holder 32, and spring 34, to thereby provide protection for the ferrule, ferrule holder, and spring. By completely surrounding and enclosing the ferrule 24, ferrule holder 32, and spring 34, any foreign contaminants, such as particles, may be prevented from entering the internal cavity and interfering with movement of the ferrule holder. The end cap 28, the ferrule retainer 36 and at least a portion of the connector body 26 may provide a protective, rigid encasement, or capsule, with a cavity formed therein for receipt of the ferrule 24, ferrule holder 32, and spring 34.

As shown in FIGS. 4 and 5, the external surface of the body of the connector body 26 may include T-shaped alignment and engagement depressions 54 that provide an engagement surface 54a to engage with internal configurations of the ferrule housing subassembly 14, discussed in further detail below.

In an embodiment, a method for assembling a pre-terminated cable end 30, may include removing appropriate lengths of the cable outer sheath 22 and cable protective layer 20 to provide a cable end as represented in FIG. 1C. The connector body 26 may then be inserted onto the cable 12 until the end of the cable outer sheath 22 abuts the projections 38 within the connector body. The ferrule 24 may be inserted into a ferrule holder 32, and together with the spring 34 the ferrule assembly may be positioned onto the end of the optical fiber 18 and cable protective layer 20. The ferrule retainer may be installed to retain the ferrule assembly within the connector body 26. The connector body 26 may be crimped onto the cable 12 to fasten the connector body in place. The ferrule tip may be finished (polished), and the protective cap 28 installed.

Some examples of fiber optic cables may have a diameter of about 3 mm for a 1-12 fiber cable, or about 4 mm for a 24 fiber cable. Un-terminated cables of such diameters may readily pass through a duct/conduit that may be, for example, a 10/6 duct (10 mm OD and 6 mm ID). A conduit may be used in situations wherein the cable must be fed over a distance, wherein obstacles may be present that would interfere with placement, or where an extra layer of protection may be needed for the cable. A relatively inexpensive conduit tube may be forced through an area without consideration of damage to the conduit end, in contrast to the use of forcibly feeding a fiber optic cable directly, wherein the end configuration of the cable may be the most expensive section of the cable and would be costly to replace if damaged. A conduit may be used for an entire length of a cable run, or over only portions of the length in areas where such may be needed, to get a cable to a location for a cable connection, that may include, for example, connection to another terminated fiber of same sized ferrule through an adapter, in a junction box, or a receiving device. Once a pre-terminated cable end 30 is at its final destination, the remaining components for providing the connector 10 of FIG. 1A, that is, the ferrule housing 14 and the outer housing 16 may be installed in a manner as indicated in FIG. 1B.

As can be seen in the cross-sectional view of FIG. 3, a pre-terminated cable end 30 may be configured to have a diameter that is only slightly larger than the diameter of the fiber optic cable 12. In an embodiment, and as examples only, wherein the fiber optic cable may be about 3 mm in diameter, the total diameter of the pre-terminated cable end may be about 4 mm, or, if the diameter of the cable may be about 4 mm, the diameter of the pre-terminated cable end may be about 5 mm. Installation and placement of such a cable may then be done, if needed, through a 6 mm conduit that is only slightly larger than the cable end.

FIGS. 6A, 6B, 7A and 7B provide detailed perspective views of the ferrule housing 14 and the outer housing 16, respectively. FIGS. 8A-8C provide plan views and cross-sectional views of a ferrule housing 14, assembled with an outer housing 16 and ferrule retainer 36 (other parts have been omitted for clarity). Ferrule housing 14 may be configured to have a central passage 56 sized to fit over the outer diameter of the ferrule retainer 36. In an embodiment, the interior of passage 56 may be configured to contact the exterior of the ferrule retainer 36 so there is no space, or play, therebetween. The pre-terminated cable end 30 may pass into the passage 56 through an end 14a of the ferrule housing 14, and the ferrule 24 may protrude from the end 14b.

As depicted in FIG. 8B, the internal surface of the passage 56 may have at least one stop 58 for limiting movement of the pre-terminated cable end into the passage. The pre-terminated cable end may move into the passage 56 until the leading edge of the ferule retainer 36 abuts the stop 58. In an embodiment, the diameter of the protective cap 28 may be greater than the internal diameter within the stops 58 and the cap 28 may need to be removed from the ferrule for insertion of the ferrule into the housing. In an alternative embodiment, the cap 28 may have a narrower diameter and may be left in place during attachment of the housing 14.

Figures 6A, 6B:
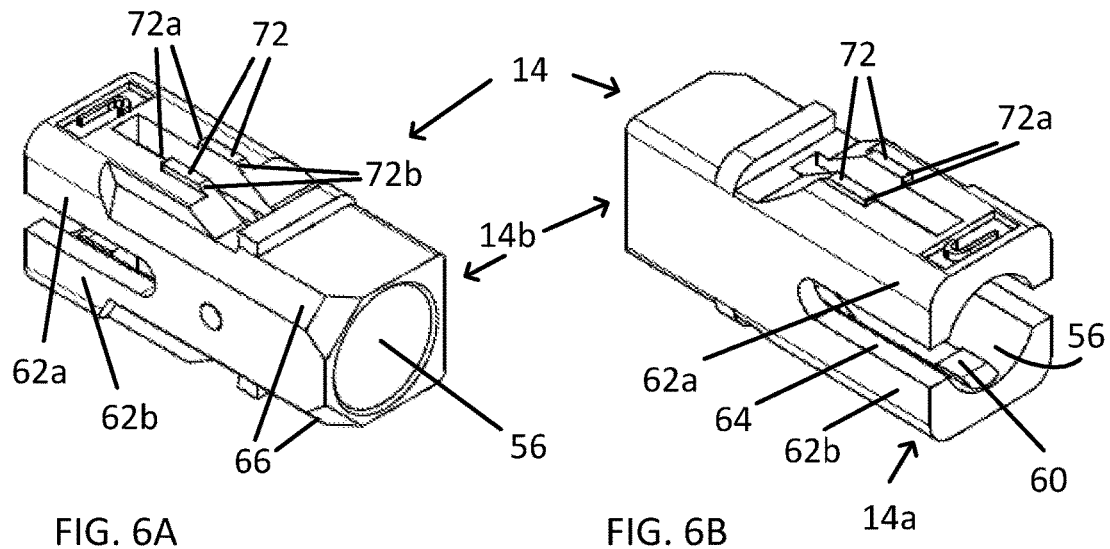
FIGS. 6A-6B depict various perspective views of a ferrule housing according to an embodiment.

The connector body 26 may be held in place within the passage 56 by a retention configuration. In an embodiment the exterior surface of the connector body 26 may include at least one T-shaped alignment and engagement depression 54, as discussed above with reference to FIGS. 3 and 4. As depicted in FIGS. 6B and 8B, and in more detail in FIG. 8C, end 14a of the ferrule housing 14 may include a projecting catch 60 having a surface 60a that engages with the surface 54a of the connector body 26.

As shown in FIGS. 6A and 6B, end 14a of the sub-assembly 14 may be configured with two halves 62a and 62b separated by slots 64. Such a configuration may allow for the halves 62a and 62b to open away from one another, and then return to their original position as shown. Catches 60 may include a beveled leading edge 65 that guides the catches over the exterior surface of the connector body 26, forcing the halves 62a and 62b to open to allow the connector body 26 to pass therein. Upon the catches passing into the T-shaped alignment and engagement depression 54, the halves 62a and 62b may return to their original position with the surface 60a engaged with the surface 54a to thereby retain the ferrule housing 14 with the connector body 26.

Because of the essentially cylindrical passage 56, the cylindrical surface of the pre-terminated cable end 30, and the ability of the two halves 62a and 62b to spread outwardly, the ferrule housing 14 may essentially be inserted onto the pre-terminated cable end 30 in any relative position until the leading edge of the ferule retainer 36 abuts the stop 58. If not aligned so that the catches 60 engage with the depressions 54, the ferrule housing 14 may be rotated about the connector body 26 until the catches engage in the depressions. Additional alignment indicators, such as markings, guides, keying features, or combinations thereof, etc., may also be provided for configurations wherein specific alignments and configurations of parts may be needed, such as for connecting ferrules with angled tips as discussed above.

Figures 7A, 7B:
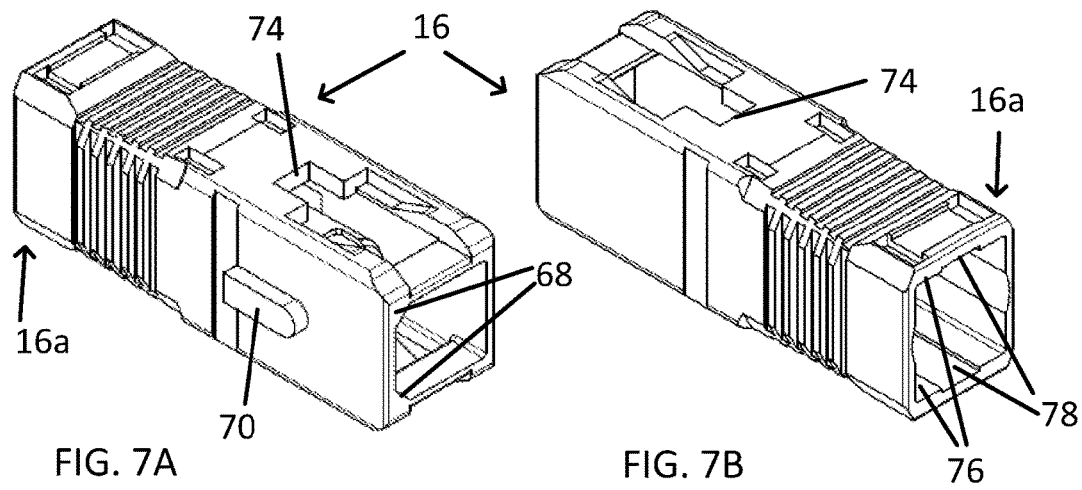
FIGS. 7A-7B depict various perspective views of an outer housing according to an embodiment.

After placing the ferrule housing 14 onto the pre-terminated cable end 30 the outer housing 16 may be installed by sliding the housing over the sub-assembly via the end 16a of the housing. In an embodiment, the outer housing 16 may fit over the ferrule housing 14 in any orientation. In an embodiment as depicted in FIGS. 6A and 7A, the outer housing 16 and ferrule housing 14 may include alignment features that only allows the outer housing to be inserted onto the ferrule housing 14 in only one orientation. As depicted in FIG. 6A, the ferrule housing 14 may be keyed by including at least one leading beveled corner 66. Similarly, the interior of the outer housing 16 may have beveled corners 68 that allow for the outer housing to fit onto the ferrule housing 14 in only one orientation. The exterior of the housing may also include a keying feature, such as projection 70 that may be used for connecting the outer housing into another connection device, such as a coupling (not shown), and which may also act as a keying indicator for placing the outer housing 16 onto the ferrule housing 14 in the desired orientation.

The outer housing 16 and ferrule housing 14 may be configured to interlock with one another to retain the parts together once assembled. In an embodiment as shown in FIGS. 6A and 6B, the ferrule housing 14 may be configured to include at least one projecting tab, such as tabs 72. As shown in FIGS. 8B and 8C, when the sub-assembly 14 is disposed within the outer housing 16, end surfaces 72a of the tabs 72 may engage with a surface, such as surface 74 (FIG. 7A) of the outer housing 16. The interior surfaces 76 (FIG. 7B) of the outer housing may include channels 78 that are configured to receive the tabs 72 therein during insertion of the sub-assembly 14 into the outer housing 16. As shown in FIG. 8C, the channels 78 may end inside the housing with an internally tapered surface 80 that leads to the surface 74.

The leading edge 72b of tabs 72 may also be tapered so that, upon insertion of the sub-assembly 14 into the housing 16 (in the direction of the arrow 82) the surface 72b will move past the surface 80, forcing the surface 80 outwardly to allow the tab 72 to pass. After the tab 72 moves past the surface 74 to the position as shown in FIG. 8C, the surface 80 will return to its original position, engaging surface 74 with the tab surface 72a, and locking the sub-assembly 14 inside the housing 16. Movement in the opposite direction to the arrow 82 will be opposed by the engagement of tab surface 72a with the surface 74.

In an embodiment as depicted in FIGS. 9A and 9B, an LC duplex connector 100 may include an optical fiber cable 112, a pair of ferrule-housings 114, and an outer housing 116 to provide a push/pull engagement and disengagement with a mating optical fiber socket (not shown). The cable 112 may include a pair of optical fiber cables 111, each with an optical fiber, such as optical fiber 18 in FIG. 1C, contained therein. The individual optical fiber cables 111 may include a protective layer 120, and both together may be covered by an outer sheath 122.

For duplex systems, the individual optical fiber cables 111 may provide for different polarity signals (straight through or reversed polarity), and therefor may be distinguished from one another by an indicator. In an embodiment, the individual cables 111 may be color-coded, wherein each strand is a different color, or at least a portion of one of the cables may carry a distinguishing characteristic that is different from the other cable. As a representation, in FIG. 13, each of the cables 111, carries a different indicator, or letters 'A' and 'B', wherein 'A' and 'B' may represent different colored protective layers 120 that surround the optical fiber, or 'A' and 'B' may be letter indicators contained in the protective layers of the cable. In an embodiment of a duplex LC connector, for example, the optical cable may have a light transmitting fiber of about 8 μm, surrounded by cladding (a material that allows light to "bounce" or propagate down the waveguide) with a diameter of about 125 μm. The protective layer 120 may have a diameter of about 250 μm or about 900 μm, and the outer sheath 122 may have a diameter of about 3 mm to about 4 mm. Both the 900 μm and 250 μm cables are stripped down to the 125 μm diameter for termination or splicing.

The optical fibers may terminate in ferrules 124, that may be retained and coupled with the cable 111 and the protective layer 120 by means of connector tubes 121. Ferrules 124 may include ferrule holders 132 (FIG. 10C), and as shown in detail in FIG. 12, an end 132a of the ferrule holders may include at least one radially disposed projection 135 to enhance retention of the connector tube 121 on the ferrule holder. Projection 135 may be triangular in longitudinal cross-section to provide an angled edge that may project into the material of the connector tube 121 and provide addition retentive force to enhance retention of the tube on the holder. Projection 135 may be a circumferential projection extending about the exterior surface of the end 132a.

Figure 10A:
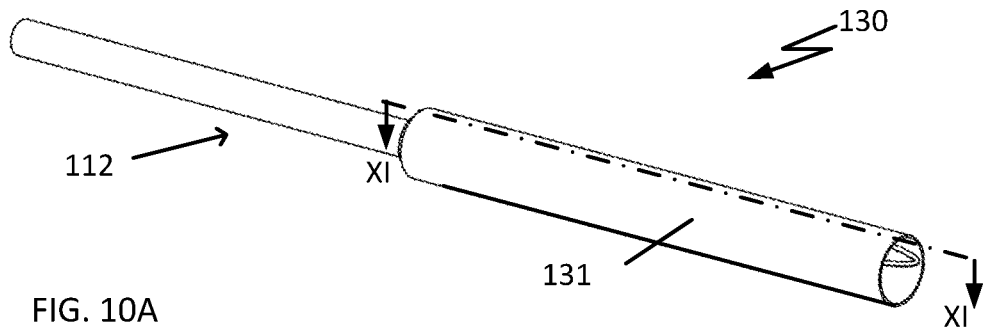
FIGS. 10A-10C depict a pre-terminated duplex fiber optic cable and an exploded view of the parts thereof, according to an embodiment.
Figure 10B:
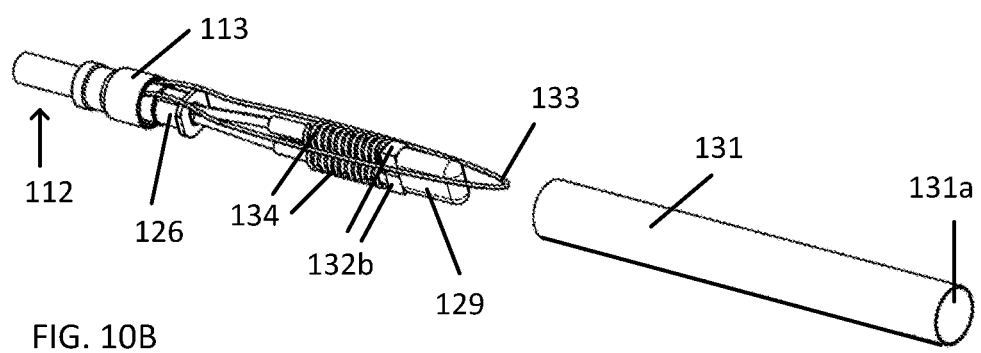
Figure 10C:
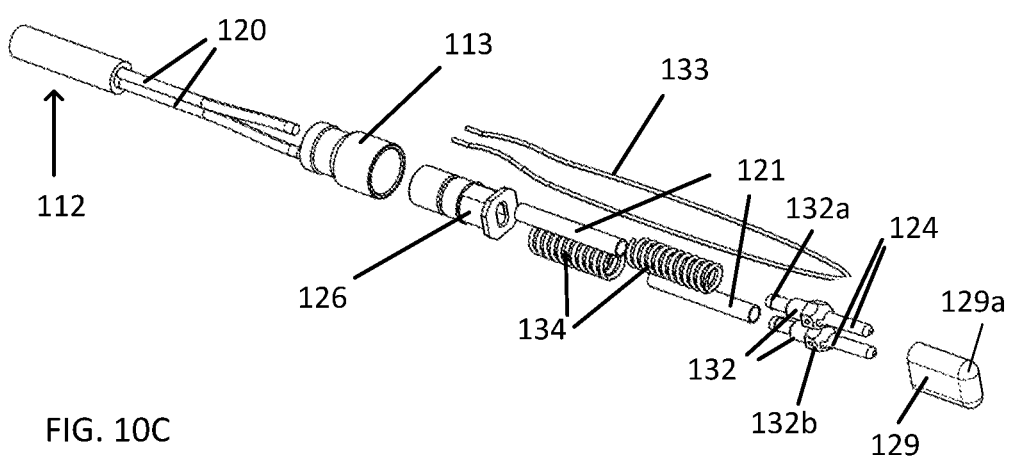

In an embodiment, the ferrules 124 may be ceramic ferrules. The ferrules 124 may be of the type LC APC (angle-polished connectors) as shown, or of the type LC UPC (ultra-polished ferrules), not shown. To provide an indicator of the type of ferrule, the shape of the ferrule holder end 132b may be different for each of the ferrule types. As shown in FIG. 9B, the end 132b may be square for LC APC ferrules, and as shown in FIG. 10C, the holder shape for LC UPC ferrules may be hexagonal. Protective caps 128 may be provided to protect the ferrules 124 and terminal end of the optical fibers in the ferrules prior to a final installation or connection with a mating wire or device (not shown).

As discussed previously for the SC connector, because of the required mechanical tolerances in the terminal end of a cable 112, costs may be reduced with an increase in quality by providing pre-terminated lengths of cable, pre-terminated at both ends with a connector plug ready to plug into a matching receptacle. In an embodiment, wherein there were no size restrictions, such as in the cross-sectional dimensions of the housing 116, a pre-terminated cable may be represented by the configuration as depicted in FIG. 9A, with the connector housing 116 and ferrule housings 114 attached to the cable 112 and the cable ends ready for connection to a coupling arrangement.

However, as mentioned previously, it may often be desirable to feed the cable 112 through a small diameter conduit, to guide the cable to a destination and provide protection for an installed cable. Therefore, it may be desirable to provide pre-terminated cables that have minimal cross-sectional dimension, or diameter. A pre-terminated cable end 130 with duplex LC connectors, may therefore be represented by a configuration as depicted in FIGS. 10A-10C, wherein the cable 112 is fitted with at least the ferrules 124 that provide the terminal end of the optical fibers. In an embodiment, wherein cylindrical springs, such as springs 134, are provided as the biasing members, the springs may also be pre-installed on the pre-terminated cable end 130. In addition, to protect the ferrules 124 and terminal ends of the optical fibers, it may also be desirable to provide the pre-terminated cable ends with an installed protective cap 129. The protective cap 129 may fit over both of the ferrules 124 and be retained on the ferrules 124 by friction. By fitting over both ferrules 124, protective cap 129 may serve to hold the ferrules together during installation of the cable 112, thereby retaining the otherwise free ends of the cable together in a controlled manner. The protective cap 129 may include rounded edges 129a to facilitate movement of the assembly through a conduit. In another embodiment, individual protective caps may be used instead of single dual cap.

In an embodiment as depicted in FIG. 10A, an additional protective tube 131 may be included as a component of the pre-terminated cable end 130 to provide an additional protective component around the otherwise exposed parts. The protective tube 131 may be formed of a low friction material, such as PTFE, to facilitate passage down a conduit. FIG. 10B depicts the pre-terminated cable end with protective tube removed. FIG. 11 depicts a cross-sectional view of the pre-terminated cable end 130 with some cable components, such as the optic fiber, removed for clarity.

In an embodiment, the protective tube 131 may be retained on the pre-terminated cable end 130 by friction, or by other retention configurations, or combinations of retention configurations. For an embodiment of a pre-terminated cable end 130, the leading end 131a of the tube 131 may be closed, so that the closed end will retain the tube 131 on the cable end when moving in an insertion direction in the conduit. In embodiments, the end 131a may be fully open, fully closed, partially covered, or fully covered with a slit opening for a pull string or pull wire attachment as discussed below.

In some installations, it may be desirable to pull the cable 112 through a conduit 139 as represented in FIG. 13. For such instances, a pull string or wire 141 may be fed through the conduit 139 and attached to the cable. To provide an attachment for the pull wire or string 141, so that the wire or string may not damage the cable components (or possibly become disconnected if attached via other methods, such as with tape), a pulling eye 133 may be included as a component of the pre-terminated cable end 130. The pull string or wire may then be tied to the pulling eye 133. The pulling eye 133 may be configured to transfer the pull force from the pull wire or string to the cable outer sheath 122, and may be shaped to fit around the ferrules 124. The pulling eye 133 may, for example, be a plastic loop, a string loop, or a wire loop. In an embodiment, the pulling eye 133 may be constructed from a stiff wire to thereby also add some protective function to the other components of the pre-terminated cable end 130. In an embodiment, the pulling eye 133 may be attached to the cable 112 by fastening an end 133a thereof between an outer crimp ring 113 and a back post 126 that may itself be crimped to the cable outer sheath 122.

In an embodiment, a method for assembling a pre-terminated cable end 130, may include removing an appropriate lengths of the cable outer sheath 22 to provide a cable end that may appear approximately as depicted at the left hand side of FIG. 10C. Outer crimp ring 130 may be slid onto the cable 112, and the back post 126 may be installed. After installation of the back post, an amount of the cable protective layer 120 may be removed to expose a length of optic fiber (not shown). Connector tubes 121 and springs 134 may be inserted onto the cable ends, and the optic fibers may be inserted through the ferrule holders 132 and into the ferrules 124. The connector tubes 121 may then be slid onto the ends 132a of the ferrule holders to be held in place by means of the projections 135. The ferrule tips may be finished (polished), and the protective cap 129 may be installed.

For embodiments that may require a pulling eye 133, the pulling eye may be positioned with the ends 133a placed over the back post 126. The outer crimp ring 113 (inserted previously about the cable 112) may be slid over the ends 133a of the pulling eye and crimped around the back post 126. The back post 126 may include retention features, such as a groove 137 (FIG. 11) into which the ends 133a may at least partially deform, to provide a stronger retention between the pulling eye 133 and the cable 112. The loop formed at the end 133b of the pulling eye 133 may be used to connect with a pull string or wire. A protective outer tube 131 may be slid over the cable end components, if desired to provide additional protection to the ferrules, etc.

As shown in FIG. 11, wherein the springs 134 are disposed adjacent each other on the pre-terminated cable end 130, the springs may provide the widest diameter of the cable end. To provide for a slight reduction in diameter, one of the springs 134 may be displaced longitudinally (for example, as shown in FIG. 10C) so that the springs are essentially end-to-end prior to positioning of the protective tube 131 over the cable end.

As can be seen in the cross-sectional view of FIG. 11, a pre-terminated cable end 130 may have a dimension that may be about two times the diameter of the fiber optic cable 112. In an embodiment, and as examples only, pre-terminated cable end 130 may have a maximum cross-sectional dimension of about 5 mm for passage through a conduit of about 6 mm internal diameter. The conduit may be a bend limiting conduit to ensure passage of the cable end therethrough. Conduits may need to have greater diameters if the installation location requires bends, with tighter bends requiring greater diameter conduits to allow for passage of the cable end.

Once a pre-terminated cable end 130 is at its final destination, generally a location for a cable connection, either to another cable, a junction box, or a receiving device, the remaining components for providing the connector 100 of FIG. 9A, that is, the ferrule housings 114 and the outer housing 116, etc., may be installed onto the cable end. For pre-terminated cable ends 130 equipped with a pulling eye 133, the pulling eye may be removed. A substantial portion of the pulling eye may be removed by cutting the pulling eye adjacent the outer crimp ring 113. The protective cap 129 may also be removed to free the ferrules 124 from one another.

As shown in FIG. 9B, the remaining components to be installed in one embodiment may include extender caps, or inner clips 115 (one for each ferrule), ferrule housings 114 (one for each ferrule), outer housing 116 (with two main body portions 116a and 116b), and protective caps 128 (one for each ferrule).

As shown in FIG. 14, the clips 115 may include at least one slot 172 that is sized to fit around the cables 111 so that the clips may be inserted onto the cables, generally in the directions as indicated by the arrows, and over the springs 134. In an embodiment, the width of the slot 172 may be substantially the same as the diameter of the cables 111. Alternatively, if the material of the clips 115 is at least partially pliable, the slot 172 may be a slit in the clips (having essentially no width) that is openable to a width that allows the cables 111 to pass therethrough.

As discussed previously with regard to the polarity of the cables 111, and their corresponding indicators (here represented by designations 'A' and 'B'), the clips 115 may also carry indicators that correspond with the indicator of the cables. As shown in FIG. 9A, the cables 111, once within the housing 116 may no longer be visible, whereas portions of the clips 115 may be visible as shown, and the visible portions of the clips may then be used to provide a determination as to the polarity of the connector 100.

FIG. 15A shows clips 115 positioned about the springs 134. In an embodiment, ferrule housings 114 may be inserted onto the clips 115 in a direction as indicated by the arrows in FIG. 15. The internal cavity within the housings 114 may have a matching correspondence with the shape of the ends 132b of the ferrule holder 132. For example, ferrule housings 114 may have a square receptacle for LC APC ferrules, or a hexagonal receptacle for LC UPC ferrules. If needed, slots 172 may be used for alignment, and/or keying purposes. For example, in an embodiment, the internal surface of the ferrule housing may include a projection (not shown) that fits into and glides along the slot 172 when the housings 114 are inserted onto the clips 115. In some embodiments, alignment/keying may not be necessary.

Clips 115 and housings 114 may include a retention configuration to hold the components together under the tension of the spring 134. In an embodiment, at least one of the clip 115 and the housing 114 may include at least one projection and the other may include at least one corresponding slot configured for receipt and retention of the projection therein. In an embodiment, the clips 115 may include angled projections 174 that have a sloped surface 174a in the direction of insertion of the housing 114 onto the clips, and an engaging surface 174b for engaging in a slot 176 in the housing 114. When the housing 114 is inserted onto the clip 115 the spring 134 is compressed and tensioned. The retention configuration may be configured to be sufficient to retain the housing 114 on the clip 115 under the applied tension. Internally within the clip 115 and the housing 114 there may be spring seats 117 and 178, respectively, for compressing the spring.

Figure 16:
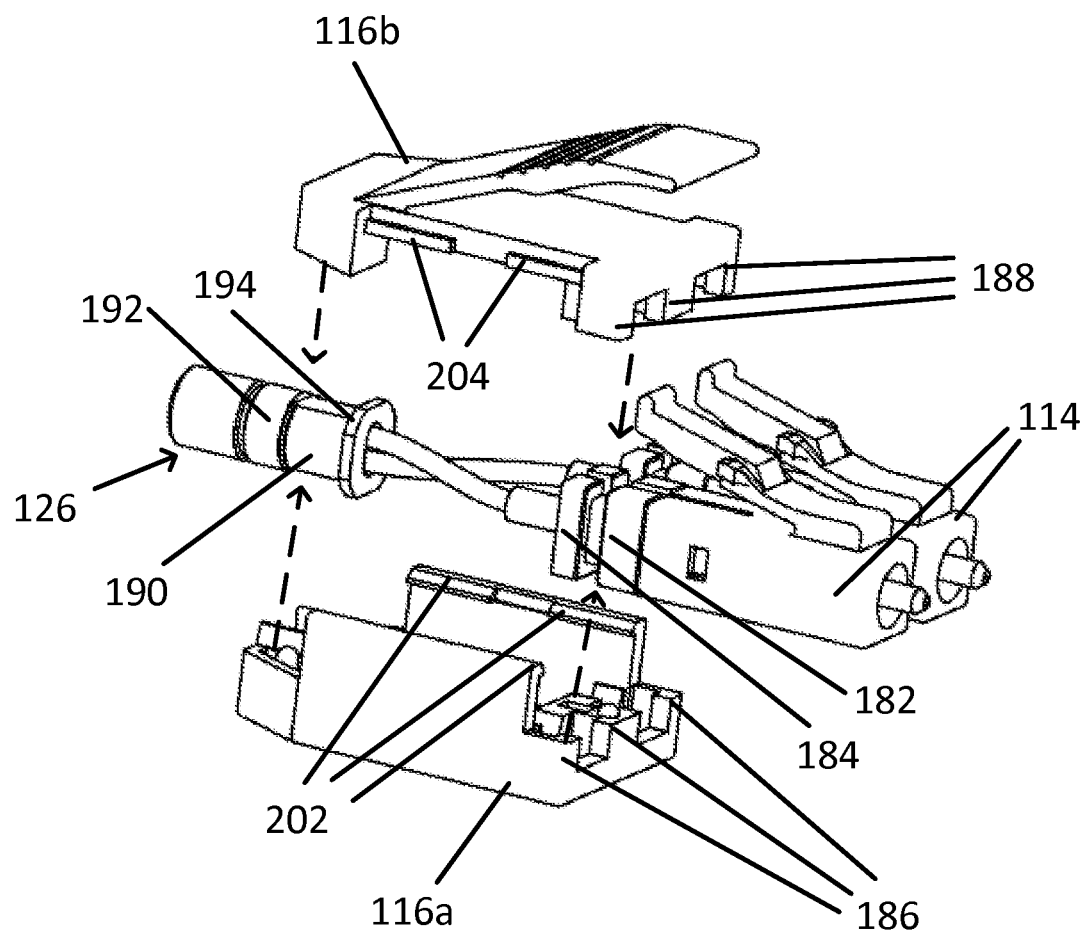
FIG. 16 depicts a perspective view of housing portions being applied to a cable end according to an embodiment.

In an embodiment, housing components 116a and 116b may be provided as two separate pieces as shown in FIGS. 16 and 17, and in the assembled view in FIG. 9A. In an alternative embodiment, not shown, the housing portions may be integrally molded and hinged along a longitudinal side thereof, so that in handling, only a single, joint piece may be required, instead of two separate pieces.

Clips 115 may be configured to include notches 180 (shown also in FIGS. 15A and 15B) that may extend around the entire perimeter of the clips 115. Alternatively, but not shown, the notches 180 may be disposed on only opposing sides, such as the top side and bottom side, or the left side and the right side. The notches 180 may thereby define a reduced width, height, or both for the body portion of the clips 115 within the notches. On each side of the notch there may be body portions 182 and 184 that define a width, height, or both that are greater than the width, height, or both of the notches 180.

Figure 17A:
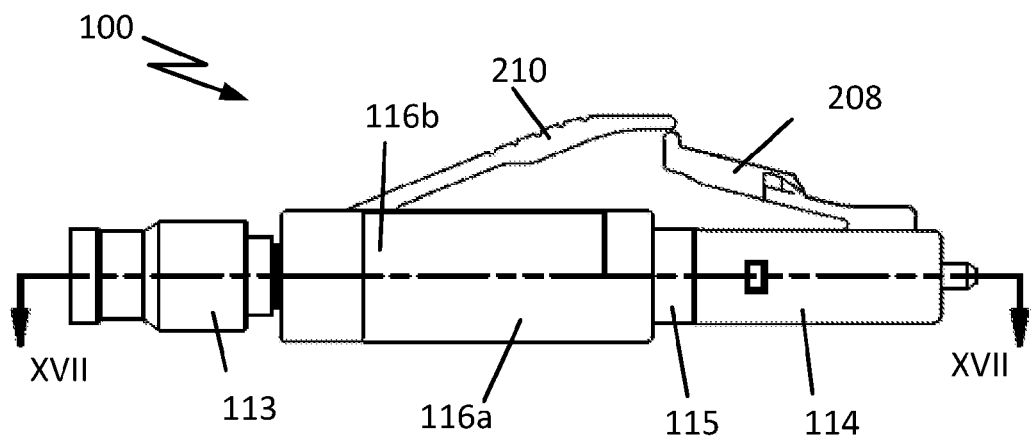
FIGS. 17A-17B depict side and cross-sectional views of a connector assembly according to an embodiment.
Figure 17B:
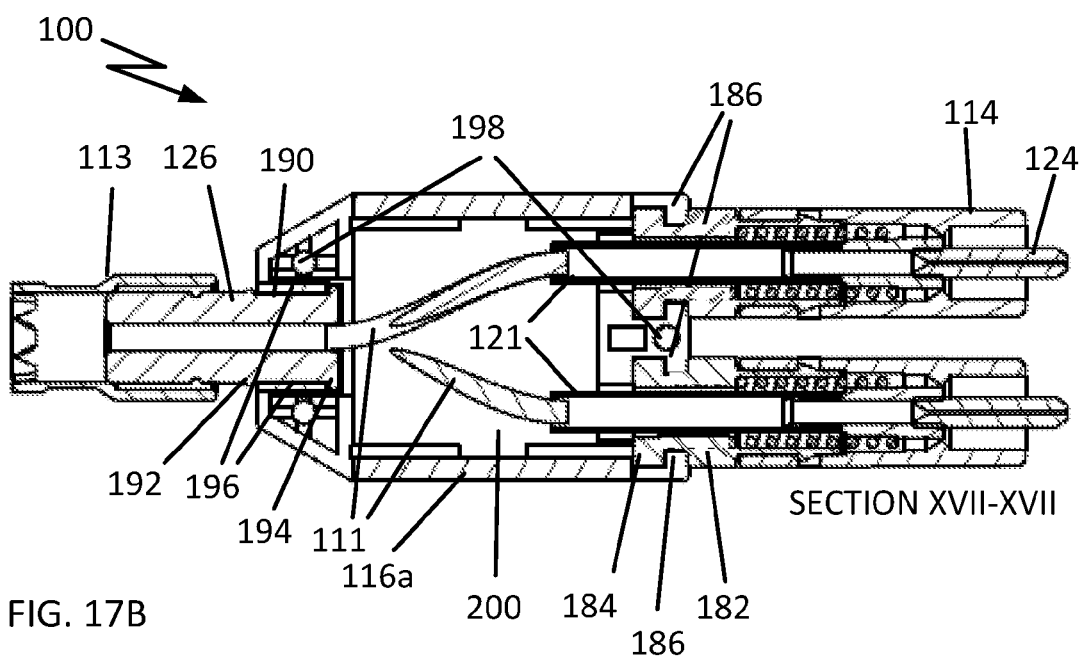

Housing components 116a and 116b may include housing wall sections 186 and 188, respectively, that fit into the notches 180 so that the body portions 182 and 184 of the clips 115 fit externally and internally, respectively, of the wall sections, as shown in detail in FIG. 17B. In this manner, when the housing components 116a and 116b are assembled together, the clips 115 may be retained in place with the housing 116.

In a similar manner, the back post 126 may also include a reduced diameter portion 190 (FIGS. 16 and 17B) delineated by body portions 192 and 194 of greater diameter. Housing sections 116a or 116b may define wall sections 196 that fit around the reduced diameter portion 190 so that the body portions 192 and 194 of the back post 126 fit externally and internally, respectively, of the wall sections, as shown in detail in FIG. 17B. In this manner, when the housing section 116a and 116b are assembled together, the back post 126 may be retained in place with the housing 116.

One or both of the housing sections 116a and 116b may include alignment guides such as pins 198 that fit into corresponding recess of the other of the housing sections to align and/or guide assembly of the housing sections. The housing sections 116a and 116b define an interior space 200 that contains and protects the cables 111.

One or both of the housing sections 116a and 116b may include a retention configuration for engaging the other of the housing sections to hold the sections together once assembled. In an embodiment, as shown in FIG. 16, the lower housing section 116a may include one or more tapered catches 202 along an upper edge thereof on each side of the housing. In a hinged embodiment as mentioned briefly above but not depicted, the catch along one side may be replaced by a hinged wall section joining the upper and lower housing sections, and the other side may include at least one catch 202. The other housing section, 116b in FIG. 16, may include corresponding projecting edges 204 along each side thereof for engaging with the catches 202. Other configurations, or various combinations of retention systems may be used for holding the housing sections 116a and 116b together, once assembled.

In an embodiment, the retention configuration for holding the housing sections 116a and 116b together may be releasable, so that the housing sections may be opened for repair, replacement, or reconfiguration of parts. As mentioned previously, a dual LC connector may provide different polarities, straight through or reversed, and the cables and clips may be color-coded, for example, to indicate the polarity. To change the delivered polarity of the connector 100, the positions of the ferrules 114 may be interchanged within the housing 116. To facilitate such a rearrangement, the upper and lower housing sections 116b and 116a may be separated by prying the side walls of the lower section away from the upper section to release the catches 202 from the projections 204. The positions of the two ferrules 114 may then be interchanged, and the housing sections replaced.

The LC connectors depicted herein, as shown in FIG. 17A, show an included latching mechanism 208 on the ferrule housing 114 for retaining the connector 100 with another connection device. In addition, a release tab 210 is shown extending from the upper housing section 116b, that when depressed, pushes down on the catch 208 to release the catch from the other connection device. Additional embodiments may, or may not include such a latch and release, or may include variants of such a latch and release.

In an embodiment, an optical fiber connector may include a first number of components configured to be moved through a duct and a second number of components configured to be assembled after the connector is moved through the duct. The first number of connector components may include a dual LC ferrule-flange, first and second connector springs, and the second number of components may include an extender cap and a housing.

In an embodiment, the duct may be a microduct.

In an embodiment, the housing may be a unibody housing.

In an embodiment, the housing may include a plug frame, a switchable connector housing bottom, and a switchable connector housing top, and the first components may include a backpost and a crimp ring.

In an embodiment, the extender cap may include a slot configured to allow for optical fibers to be slid into the extender cap after the first number of components are moved through the duct.

In an embodiment, the first and second connector springs are configured to be staggered during movement through the duct such that the first and second connector springs occupy a radial distance less than twice a diameter of the first and second connector springs.

In an embodiment, the first number of components may further include a protection sleeve configured to protect the optical fiber connector during movement through the duct.

In an embodiment, the first number of components may further include a dust cap configured to protect the optical fiber connector during movement through the duct.

In an embodiment, the first number of components may further include a pull cord configured to allow pulling of the first number of components through the duct.

In an embodiment, the pull cord is crimped to a crimping sleeve of the backpost.

In an embodiment, systems and devices for optical fiber connectors may include a first number of connector components configured to be pushed through a duct or conduit. The first number of connector components may include a ferrule and a first component and a second component configured to mate over the ferrule, wherein the first number of connector components are configured to mate with a number of optical fiber connector components after being pushed through the duct.

In an embodiment, the first number of connector components may include a ferrule holder, a spring, and an outer sleeve.

In an embodiment, the first component and the second component may be configured to mate the ferrule, ferrule holder, and spring with the outer sleeve.

In an embodiment, the ferrule, ferrule holder, and spring may be FC components, and the outer sleeve may be an SC component.

In an embodiment, the first component may be a fit ring and the second component may be a backpost.

In an embodiment, an optical fiber connector system may include a pushable optical fiber connector that includes a first number of components configured to be moved through a duct, wherein the components may include a dual LC ferrule-flange, first and second connector springs, and a second number of components including an extender cap configured to be assembled to a housing after being moved through the duct, and a protective sleeve configured to protect the pushable optical fiber connector as it is pushed through the duct.

In an embodiment, the system may include a component adaptable to a drill and configured to push the optical fiber connector through the duct.

In an embodiment, an optical fiber connector system may include a pushable optical fiber connector that includes a first number of connector components configured to be pushed through a duct. the first number of connector components may include a ferrule and a first component and a second component configured to mate over the ferrule, wherein the first number of connector components are configured to mate with a number of SC optical fiber connector components after being pushed through the duct, and a protective sleeve configured to protect the pushable optical fiber connector as it is pushed through the duct.

In an embodiment, a method for assembling an optical fiber connector may include assembling a first number of connector components, and mating the first number of connector components with a second number of connector components after the first number of connector components are moved through a duct.

In an embodiment, the first number of connector components may be configured to be pushed through the duct and may include a dual LC ferrule-flange and first and second connector springs, wherein the second number of connector components may include an extender cap configured to be assembled to a housing after being moved through the duct.

In an embodiment, the first number of connector components may be configured to be pushed through a duct and may include a ferrule and a first component and a second component configured to mate over the ferrule, wherein the first number of connector components may be configured to mate with a number of SC optical fiber connector components after being pushed through the duct.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A terminal end assembly for an optical fiber cable, the assembly comprising:
a first plurality of connector components configured to pass through a conduit; and a second plurality of connector components configured to be installed around at least some of the first plurality of connector components after the first plurality of connector components is at least one of pushed and pulled through the conduit.

2. The terminal end assembly of claim 1, wherein the first plurality of connector components comprises:
at least one ferrule for receiving and terminating an optical fiber of the optical fiber cable; and
a pulling eye retained on the terminal end of the optical fiber cable.

3. The terminal end assembly of claim 2, wherein the pulling eye is removable.

4. The terminal end assembly of claim 2, wherein the first plurality of connector components further comprises a protective tube arranged around the at least one ferrule.

5. The terminal end assembly of claim 4, wherein the protective tube is formed from a low friction material.

6. The terminal end assembly of claim 4, wherein the protective tube is formed from polytetrafluoroethylene.

7. The terminal end assembly of claim 4, wherein the protective tube is retained via a friction fit.

8. The terminal end assembly of claim 2, wherein the second plurality of connector components comprises at least one ferrule housing and an outer housing.

9. The terminal end assembly of claim 2, wherein the first plurality of connector components further comprises a biasing member.

10. The terminal end assembly of claim 1, wherein the first plurality of connector components has a maximum cross-sectional dimension of about 5 mm.

11. The terminal end assembly of claim 1, wherein the conduit has an internal diameter of about 6 mm.

12. The terminal end assembly of claim 1, wherein the terminal end assembly is configured for an LC-type connection assembly.

13. A method of manufacturing a terminal end assembly for an optical fiber cable, the method comprising:
providing a first plurality of connector components configured to pass through a conduit; and
providing a second plurality of connector components configured to be installed around at least some of the first plurality of connector components after the first plurality of connector components is pushed or pulled through the conduit.

14. The method of claim 13, wherein providing the first plurality of connector components comprises:
providing at least one ferrule for receiving and terminating an optical fiber of the optical fiber cable; and
providing a pulling eye for retaining on the terminal end of the optical fiber cable.

15. The method of claim 14, wherein the pulling eye is removable.

16. The method of claim 14, wherein providing the first plurality of connector components further comprises arranging a protective tube around the at least one ferrule.

17. The method of claim 16, wherein the protective tube is formed from a low friction material.

18. The method of claim 16, wherein the protective tube is formed from polytetrafluoroethylene.

19. The method of claim 16, further comprising retaining the protective tube via a friction fit.

20. The method of claim 14, wherein providing the second plurality of connector components comprises providing at least one ferrule housing and an outer housing.

21. The method of claim 14, wherein providing the first plurality of connector components further comprises providing a biasing member.

22. The method of claim 13, wherein the first plurality of connector components has a maximum cross-sectional dimension of about 5 mm.

23. The method of claim 13, wherein the conduit has an internal diameter of about 6 mm.

24. The method of claim 13, wherein the terminal end assembly is configured for an LC-type connection assembly.

25. A method for installation of an optical fiber, the method comprising:
progressing a pre-terminated terminal end assembly through a conduit via at least one of pushing and pulling, the pre-terminated terminal end assembly comprising a first plurality of connector components configured to pass through the conduit; and
installing a second plurality of connector components around at least some of the first plurality of connector components after the first plurality of connector components is at least one of pushed and pulled through the conduit.

26. The method of claim 25, wherein the first plurality of connector components comprises at least one ferrule and a pulling eye, and the second plurality of connector components comprises at least one ferrule housing and an outer housing.

* * * * *